United States Patent
Boehlke et al.

(10) Patent No.: US 12,443,386 B1
(45) Date of Patent: Oct. 14, 2025

(54) SYSTEMS AND METHODS FOR AUDIO TRANSPORT

(71) Applicant: Datavault AI, Inc., Beaverton, OR (US)

(72) Inventors: Kenneth A. Boehlke, Beaverton, OR (US); Jason R. Abele, Beaverton, OR (US)

(73) Assignee: DATAVAULT AI INC., Beaverton, OR (US)

( * ) Notice: Subject to any disclaimer, the term of this patent is extended or adjusted under 35 U.S.C. 154(b) by 270 days.

(21) Appl. No.: 18/196,419

(22) Filed: May 11, 2023

Related U.S. Application Data (60) Provisional application No. 63/340,908, filed on May 11, 2022.

(51) Int. Cl.
  *G06F 3/16* (2006.01)

(52) U.S. Cl.
  CPC .................. *G06F 3/162* (2013.01)

(58) Field of Classification Search
  CPC ..................................... G06F 3/162
  See application file for complete search history.

(56) References Cited

U.S. PATENT DOCUMENTS

| | | | |
|---|---|---|---|
| 2020/0229206 A1* | 7/2020 | Badic | G05D 1/225 |
| 2022/0109622 A1* | 4/2022 | Yeh | H04L 67/10 |

FOREIGN PATENT DOCUMENTS

| | | | | |
|---|---|---|---|---|
| WO | WO-2020163722 A1 * | 8/2020 | | H04S 7/304 |

* cited by examiner

*Primary Examiner* — Carolyn R Edwards
*Assistant Examiner* — Aaron Justin Thompson
(74) *Attorney, Agent, or Firm* — Goodhue, Coleman & Owens, P.C.

(57) ABSTRACT

The present disclosure provides for novel systems and methods of audio transmission that alleviate shortcomings in the art, and provide novel mechanisms for robust and scalable audio transmission. In some embodiments, a method of audio transmission may transmit source audio data through a forward link while receiving microphone audio data from a receiver via a reverse link.

20 Claims, 4 Drawing Sheets

SYSTEMS AND METHODS FOR AUDIO TRANSPORT

CROSS-REFERENCE TO RELATED APPLICATIONS

This application claims the benefit of U.S. Provisional Patent Application No. 63/340,908, filed May 11, 2022, which is incorporated by reference herein in its entirety.

FIELD OF THE DISCLOSURE

The present disclosure is related generally to the wireless distribution of high-quality audio signals and, in particular to systems and methods of distributing high-bitrate, multi-channel, audio wirelessly while maintaining low latency.

BACKGROUND

Generally, a key element of a positive customer experience with wireless audio systems is a robust-low latency wireless link. Low latency audio is desirable for enabling good audio to video synchronization (or Lip Sync). For example, low latency audio systems allow for compatibility with abroad range of televisions. A low latency audio system will work with both low and high latency televisions as the transmitted audio can always be delayed to match the video.

On the other hand, an audio system with high latency may be incompatible with low latency televisions because the audio cannot be advanced to match the video. Low latency requires quick access to the radio medium as well as low computational times. Techniques found in the art have failed to achieve significant latency reductions due to the high-cost computation resources required to achieve accurate transmission with low latency.

SUMMARY

The present disclosure provides for novel systems and methods of audio transmission that alleviate shortcomings in the art, and provide novel mechanisms for robust and scalable audio transmission. In some embodiments, a method of audio transmission may transmit source audio data through a forward link while receiving microphone audio data from a receiver via a reverse link.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

In some aspects, the techniques described herein relate to a method of transmitting audio data. In some aspects, the method includes determining a forward link network quality corresponding to a forward link and a reverse link network quality corresponding to a reverse link and determining a forward link presentation delay associated with the forward link and a reverse link presentation delay associated with the reverse link. In some aspects, the method further includes generating at least one of a link schedule, a physical and network coding, and a source coding for at least one of the forward link and the reverse link based on the respective forward and reverse presentation delays and the respective forward and reverse network qualities. In some aspects, the method also includes transmitting audio data through the at least one of the forward link and the reverse link based on the at least one of the link schedule, the physical and network coding, and the source coding.

In some aspects, determining at least one of the forward link network quality and the reverse link network quality can include determining a packet error rate, and generating the at least one of a link schedule, a physical and network coding, and a source coding is based on whether the respective link network quality is above a predetermined threshold associated with a target audio quality.

In some aspects, the link schedule can be generated using a method selected from the group comprising: a Forward Control method, an Independent Channel Control method, a Tuning Channel Access Parameters method, and a Network Allocation Vector (NAV) Reservations method.

In some aspects, the generated link schedule can allow for additional time in a link channel. In some aspects, generating a source coding includes increasing a level of audio compression associated with the source coding.

In some aspects, the forward link can be a communications link between a transmitting speaker and a receiving speaker and wherein the forward link comprises modified audio data corresponding to audio data from a source communicatively coupled to the transmitting speaker.

In some aspects, the reverse link can be a communications link between a receiving speaker and a transmitting speaker and wherein the reverse link comprises microphone audio data from a microphone communicatively coupled to the receiving speaker.

In some aspects, the techniques described herein relate to a non-transitory computer-readable storage medium, the computer-readable storage medium including instructions that when executed by a device, cause the device to: determine a forward link network quality corresponding to a forward link and a reverse link network quality corresponding to a reverse link; determine a forward link presentation delay associated with the forward link and a reverse link presentation delay associated with the reverse link; generate at least one of a link schedule, a physical and network coding, and a source coding for at least one of the forward link and the reverse link is based on the respective forward and reverse presentation delays and the respective forward and reverse network qualities; and transmit audio data through the at least one of the forward link and the reverse link based on the at least one of the link schedule, the physical and network coding, and the source coding.

In some aspects, the techniques described herein relate to a device comprising: a processor; and a memory storing instructions that, when executed by the processor, configure the device to: determine a forward link network quality corresponding to a forward link and a reverse link network quality corresponding to a reverse link; determine a forward link presentation delay associated with the forward link and a reverse link presentation delay associated with the reverse link; generate at least one of a link schedule, a physical and network coding, and a source coding for at least one of the forward link and the reverse link is based on the respective forward and reverse presentation delays and the respective forward and reverse network qualities; and transmit audio data through the at least one of the forward link and the reverse link based on the at least one of the link schedule, the physical and network coding, and the source coding.

Certain embodiments will now be described in greater detail with reference to the figures.

Figure 1:
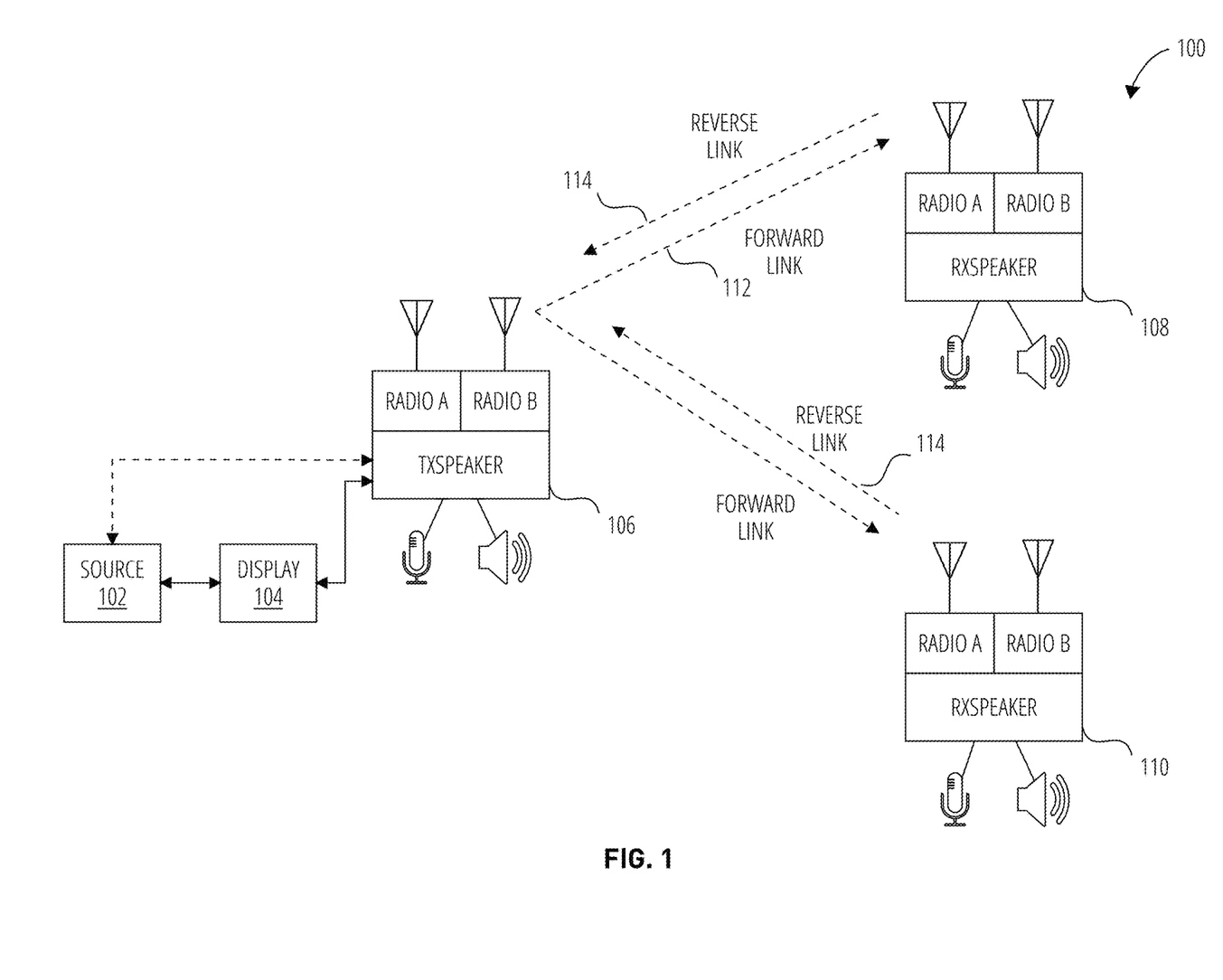
FIG. 1 is a block diagram illustrating components of an exemplary system according to some embodiments of the present disclosure.

In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 100 may be combined into a single device.

As shown, system 100 of FIG. 1 may include a data source 102, display 104, a transmitter-speaker (TxSpeaker) 106, and one or more receiver-speakers (e.g., RxSpeakers 108 and 110). In some embodiments, RxSpeakers 108-110 may be referred to as wireless satellite units. In some embodiments, TxSpeaker 106 and RxSpeakers 108-110 may include microphones and speakers.

In some embodiments, source 102 may be a source of digital audio and/or video. In some embodiments, source 102 is the internet. In some embodiments, source 102 may transmit an audio/video stream including a plurality of packets. In some embodiments, source 102 may be a media player, a gaming console, a mobile device, a networking device, or any other device capable of reproducing and/or transmitting media. In some embodiments, an audio/video stream may be provided to a display 104 for displaying (e.g., a television, a projector, a display monitor) visual media associated with the audio/video stream.

For example, in an embodiment, where the source 102 is a gaming console, source 102 may transmit audio and/or graphics corresponding to gameplay to the display 104. In turn, display 104 may display the graphics. In some embodiments, an audio component of a media stream may be transmitted directly from the source 102 to the TxSpeaker 106. In some embodiments, the media steam may be transmitted from the source 102 to the display 104 and, in turn, the display 104 may transmit audio information corresponding to the media stream to the TxSpeaker 106.

According to some embodiments, TxSpeaker 106 may process the audio information and transmit the processed or transformed audio information to the one or more RxSpeakers (e.g., RxSpeaker 108 and RxSpeaker 110).

According to some embodiments, system 100 may be a multi-radio architecture. In some embodiments, data transmitters and receivers of system 100 may utilize one or more radio chains to communicate. For example, in the non-limiting embodiment of FIG. 1, TxSpeaker 106 and RxSpeakers 108 and 110 have two radio chains Radio A and Radio B. In some embodiments, TxSpeaker 106 and RxSpeakers 108 and 110 may have one or more radio chains.

In an embodiment, TxSpeaker 106 and RxSpeakers 108 and 110 may communicate through independent radio chains. For example, in some embodiments, TxSpeaker 106 may communicate with RxSpeakers 108 and 110 through Radio A, Radio B, or both. It will be noted that, in some embodiments, any radio chain of TxSpeaker 106 and RxSpeakers 108 and 110 may communicate with any other radio chain. For example, in some embodiments, TxSpeaker 106 may use Radio A to communicate with Radio B of RxSpeaker 108 while communicating with Radio A of RxSpeaker 110. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a f a wireless network protocol. For example, in some embodiment, a physical layer rate may be 6 Mbps using Binary Phase-Shift Keying (BPSK) and a coding rate of 1/2 as disclosed in 802.11a. In some embodiments, a physical layer rate may be 54 Mbps using 64-QAM scheme and a coding rate of 3/4 as disclosed in 802.11a.

According to some embodiments, Channel A and Channel B may have different communication methods (e.g., Broadcast/Multicast v. Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 106, RxSpeaker 108, and RxSpeaker 110 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

According to some embodiments, TxSpeaker 106 may transmit data containing source audio information (e.g., received from source 102) to RxSpeakers 108-110 via one or more forward links 112. In some embodiments, the forward link 112 between TxSpeaker 106 and RxSpeaker 108 may be independent of the forward link 112 between TxSpeaker 106 and RxSpeaker 110 or any other RxSpeaker or satellite unit.

In some embodiments, RxSpeakers 108-110 may transmit microphone audio information to the TxSpeaker 106 via one or more reverse links 114. In some embodiments, the reverse link 114 between RxSpeaker 108 and TxSpeaker 106 may be independent from the reverse link 114 between RxSpeaker 110 (or any other satellite unit or device) and the TxSpeaker 106.

In some embodiments, beside speaker and microphone data, TxSpeaker 106 and RxSpeakers 108-110 may exchange forward and reverse control and status data to maintain a link's operation and provide a control channel for customer's applications. In some embodiments, TxSpeaker 106 and RxSpeakers 108-110 may exchange control and status data using forward link 112 and/or reverse link 114.

In some embodiments, each link (e.g., forward link 112 and reverse link 114) may have a separate throughput and delay requirement to meet the user's requirements for audio fidelity and transmission delay. In some embodiments, timing is tracked using a Timing Synchronization Function (TSF).

In some embodiments, TxSpeaker 106 transmit via the forward link 112 using unicast, multicast, or groupcast packets to send data to each RxSpeaker (e.g., RxSpeakers 108-110) individually or TxSpeaker 106 may send data to all the RxSpeakers (e.g., RxSpeakers 108-110) at once. In some embodiments, packets transmitted over reverse link 114 may be unicast, multicast, or groupcast packets.

In some embodiments, TxSpeaker 106 may act as a Wireless Access Point and RxSpeakers 108-110 may act as a client in a wireless network architecture (e.g., WiFi). In some embodiments, a mesh network architecture may allow RxSpeakers 108-110 to send all of the same packet types that a TxSpeaker 106 can. In some embodiments, some devices (e.g., TxSpeaker 106, RxSpeakers 108-110) may allow the use of Action Management Frames to send packets between all members of a network.

Figure 2A:
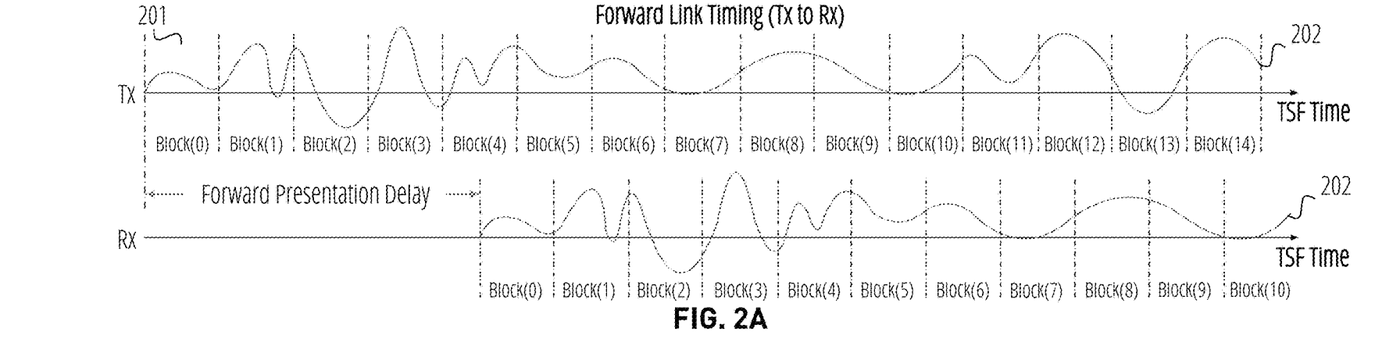
FIG. 2A illustrates a timing diagram of data transmission on a forward link according to some embodiments of the present disclosure.
Figure 2B:
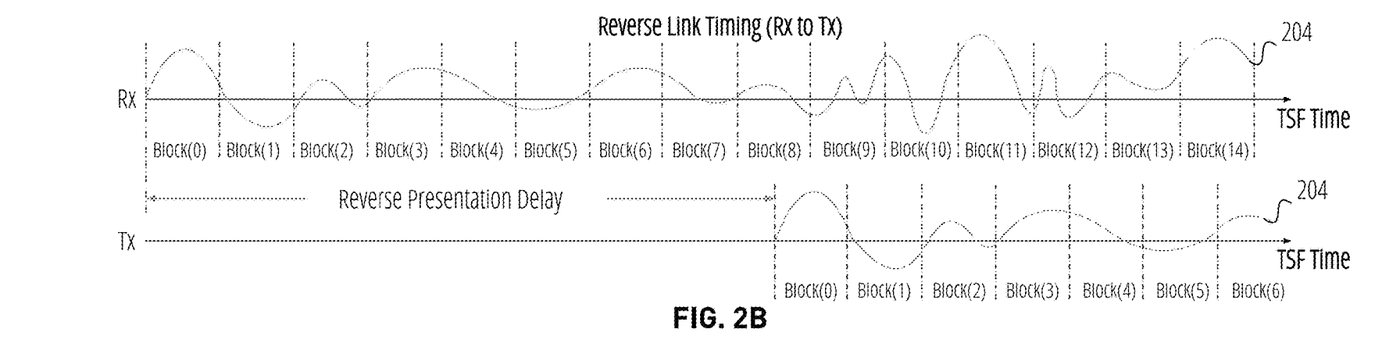
FIG. 2B illustrates a timing diagram of data transmission on a reverse link according to some embodiments of the present disclosure.
Figure 2C:
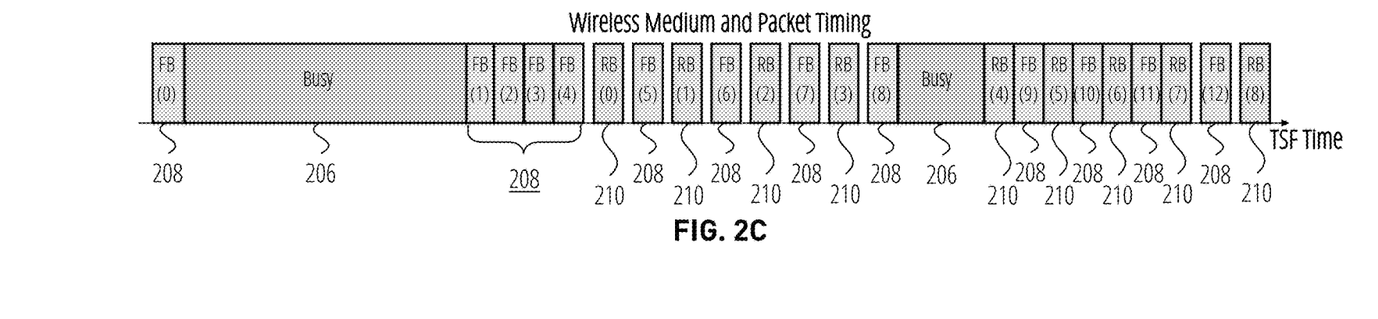
FIG. 2C illustrates a timing diagram of data packets according to some embodiments of the present disclosure.

Turning now to FIG. 2A-2C, FIG. 2A illustrates a timing diagram of data transmission on a forward link 202 according to some embodiments of the present disclosure. FIG. 2B illustrates a timing diagram of data transmission on a reverse link 204 according to some embodiments of the present disclosure. FIG. 2C illustrates a timing diagram of data packets according to some embodiments of the present disclosure.

Figure 4:
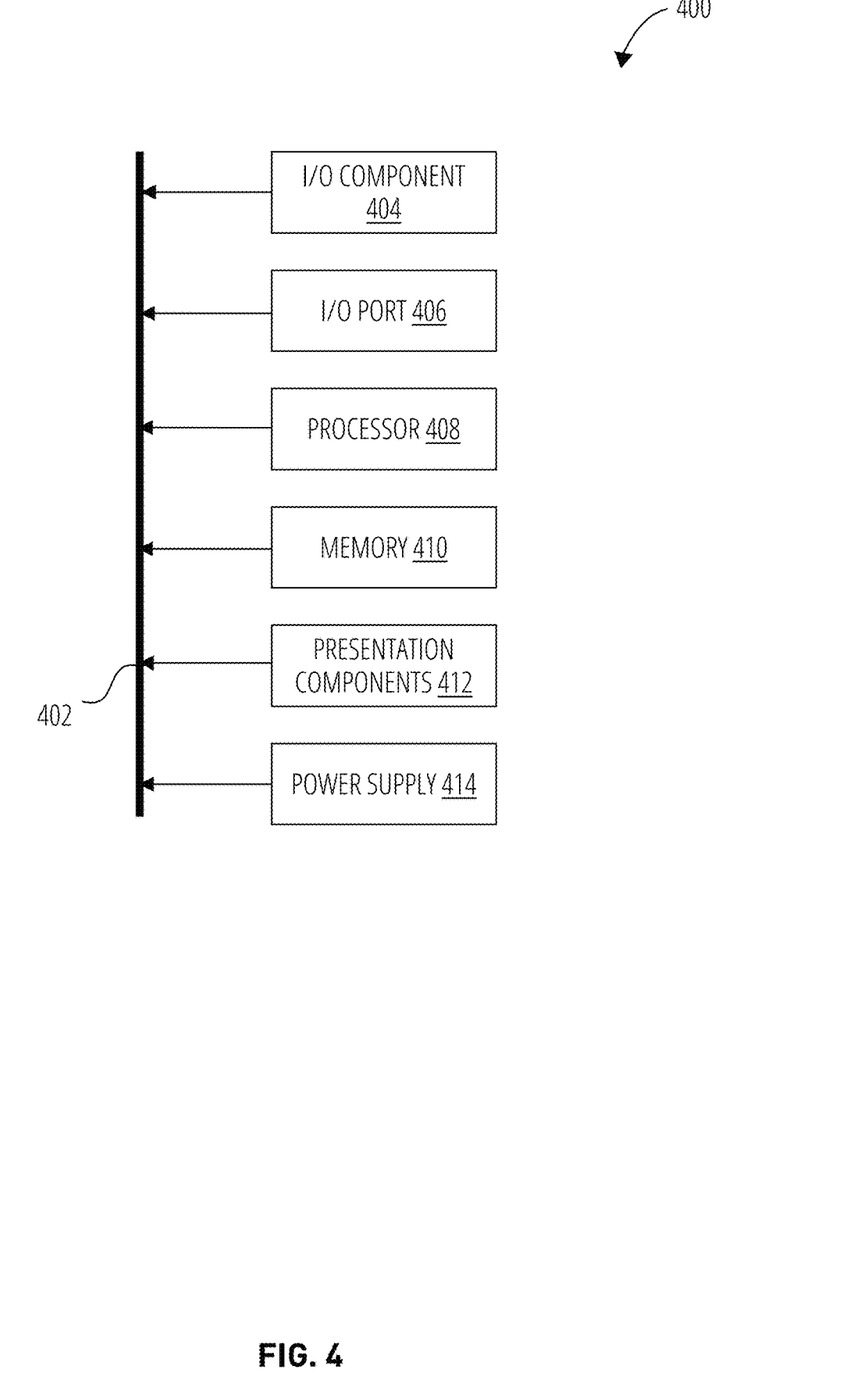
FIG. 4 is a schematic diagram illustrating an example embodiment of a device according to some embodiments of the present disclosure.

According to some embodiments, each block 201 of data (e.g., block(0) through block(14)) may be tagged with a Presentation Time stamp, which is the TSF time that the first sample in the block should be played by a device (e.g., TxSpeaker 106 and RxSpeakers 108-110 as discussed in relation to FIG. 1 or a device 400 discussed in relation to FIG. 4). In some embodiments, a block 201 of data may be made up of several packets that are Network Coded together. In some embodiments, forward and reverse links can have a different presentation delay parameters or margins (e.g., forward presentation delay, reverse presentation delay), where the presentation delay indicates a difference between the time the audio was sampled or acquired and what TSF time it will be played or rendered in the future.

According to some embodiments, the forward link 202 and reverse link 204 may share a Wireless Medium with other wireless networks (e.g., WiFi). In some embodiments, the forward link 202 and reverse link 204 may correspond to forward link 112 and reverse link 114, respectively, discussed in relation to FIG. 1. In some embodiments, forward link 202 may include forward link packets 208 illustrated in FIG. 2C. In some embodiments, reverse link 204 may include reverse link packets 210 illustrated in FIG. 2C. In some embodiments, packets from other wireless networks may be represented by packets in busy slots 206 in FIG. 2C.

As will be noted, the presentation delay margins (e.g., forward presentation delay, reverse presentation delay) shown in FIGS. 2A and 2B may be the Figure of Merit used to adjust audio links. In some embodiments, Presentation Margin is the residual time left from the arrival of the packets at the receiver (e.g., TxSpeaker 106 and RxSpeakers 108-110) to when they must be processed and played by the receiver. In some embodiments, a negative presentation delay margin may indicate that the packets are received at the receiver too late to process and cannot be played. In some embodiments, an error concealment process generates similar audio for these late blocks. In some embodiments, a positive presentation delay margin may indicate a measure of how robust the link timing is and how free the wireless medium is.

Figure 3:
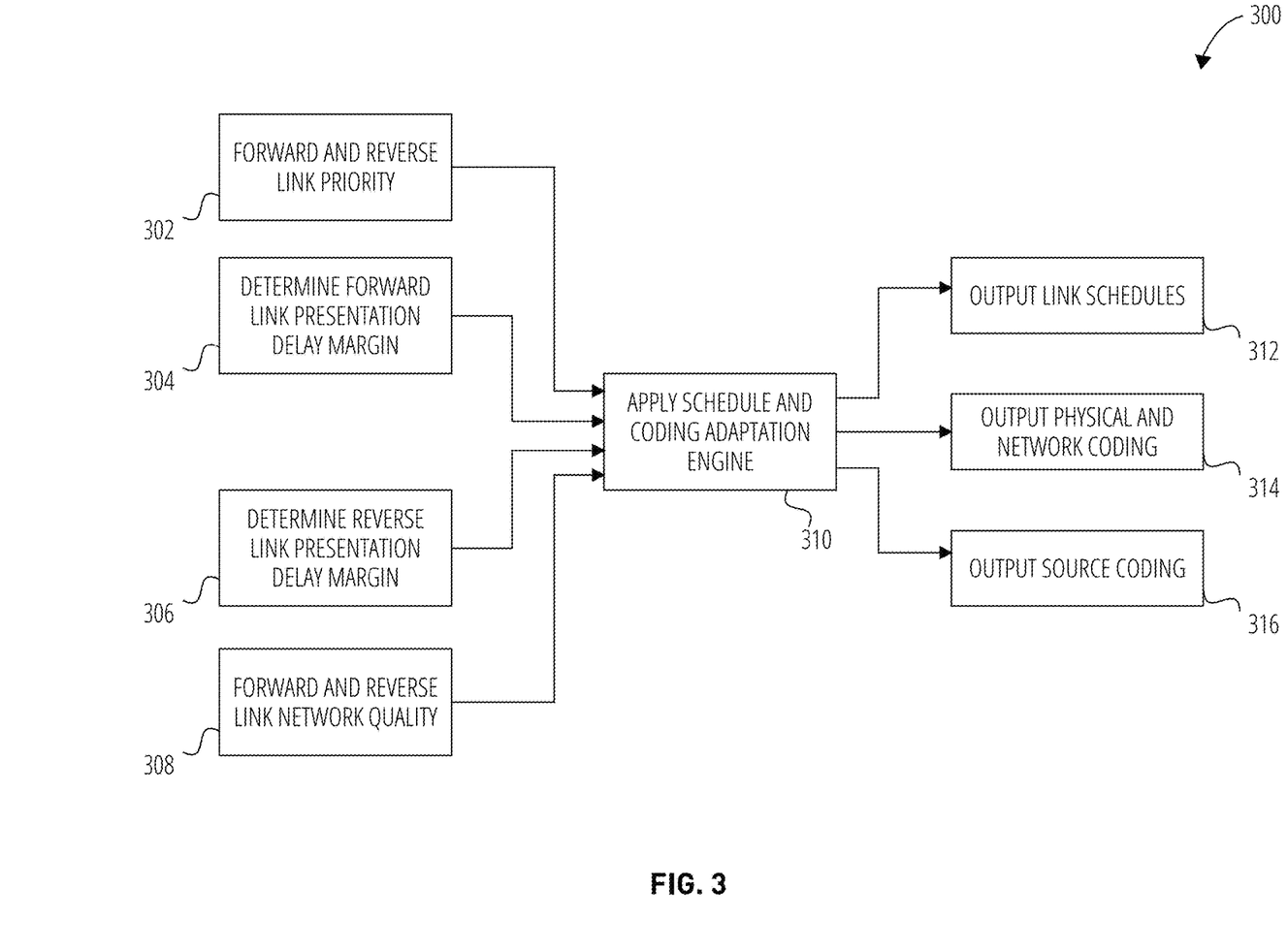
FIG. 3 illustrates an aspect of the subject matter in accordance with one embodiment.

Turning to FIG. 3, Process 300 details a non-limiting embodiment for audio transmission. The Steps of Process 300 may be performed with respect to the environment discussed in relation to FIG. 1 and the packet transmission discussed in relation to FIGS. 2A-2C.

According to an embodiment, a wireless audio system (e.g., system 100) may be set up to adapt to the constraints of a wireless medium by adjusting a parameter. In some embodiments, the parameter may be the link schedules. In some embodiments, the parameter may be a radio physical (PHY) coding rate. In some embodiments, the parameter may be s network coding rate. In some embodiments, the parameter may be a level of source coding (e.g., audio compression) based on the presentation delay margins, link priorities, and network qualities.

In some embodiments, in Step 302, a device (e.g., a TxSpeaker or RxSpeaker) of a wireless audio system may receive or otherwise determine a forward and reverse link priority. In some embodiments, the system may determine a relative link priority between the forward and reverse links priorities. In some embodiments, the forward and reverse link priorities can be predetermined or can be dynamically determined. For example, in some embodiments, the link priorities can be determined by the type of data (e.g., audio data, microphone data, or control data). In some embodiments, the link priorities can be determined when the links are established based on desired performance goals for each link.

In some embodiments, in Step 308, the device may receive a forward and reverse link network quality. In some embodiments, the forward link network quality and reverse link network quality can be determined by the device by analyzing the link performance. For example, in some embodiments, a link network quality can be based on packet error rates or difficulty to get onto the medium.

In some embodiments, in Step 304, the device may determine a forward link presentation delay margin. In some embodiments, in Step 306, the device may determine a reverse link presentation delay margin. In some embodiments, a presentation delay margin indicates a time difference between a time when a packet was received at a device and a time when it must be played or processed by the device.

As will be noted, Steps 302-308 may be performed in any order.

In some embodiments, in Step 310, when there are adequate presentation delay margins and/or link network qualities, a schedule and coding adaptation engine implemented on the device may adjust a link schedule of the forward and/or reverse links to optimize the combined presentation delay margins. In some embodiments, a link schedule can be adjusted to add more time in the medium for a given device (e.g., additional time in the link channel to transmit the audio data). In some embodiments, an adequate presentation delay margin exceeds the estimated time it would take to render (e.g., play) or process an audio packet into reproduceable audio. In some embodiments, if the presentation delay margin is not adequate (e.g., the packet is too late for appropriate rendering or processing), an error concealment process can be performed to render or playback other audio packets and conceal the absence of the missing packets from the audio.

In some embodiments, an adequate network quality is indicated by an acceptable packet error rate. That is, in some embodiments, an adequate network quality can indicate that a high enough percentage of the packets are received by the device so that a network coding scheme can recover the audio data. In some embodiments, an acceptable packet error rate (e.g., 5%, 10%, 50%, 75%) can be determined based on a predetermined or target audio quality.

In some embodiments, as the presentation delay margins decrease the physical, network, and source coding may be optimized for lower time on the wireless medium to maintain the data flow during a busy medium. In some embodiments, optimizing the physical error coding can include lowering physical error coding by increasing a PHY rate. In some embodiments, optimizing the network coding can include decreasing the network coding by sending or transmitting fewer redundant packets. In some embodiments, optimizing the source coding can include increasing the source coding to decrease the number of bits (e.g., packets) to be transferred.

In some embodiments, when a link network quality is low, the robustness of the link (e.g., forward or reverse links) can be improved by increasing a physical and/or network error coding and a level of audio compression (e.g., source coding) while maintaining a similar time on the medium.

In some embodiments, a link scheduling may be controlled through one or more methods including: Forward Control, Independent Channel Control, Tuning Channel Access Parameters, and Network Allocation Vector (NAV) Reservations. In some embodiments, in the Forward Control method, a special packet or a field in the header of the transmitted audio packets may contain information of time slots (in units of TSF time) when a receiver (e.g., an RxSpeaker) is allowed to send packets to the transmitter (e.g., a TxSpeaker). In some embodiments, if there are multiple receivers then the transmitter may activate each receiver's reverse link in turn as required to maintain a reverse flow. That is, in some embodiments, preventing any one RxSpeaker from monopolizing the link ensures that the reverse flow on all RxSpeakers is maintained to prevent loss of function by that speaker or interference with one speaker's response to any other speaker's request.

In some embodiments, in the Independent Channel Control method, Link Scheduling may alternately be coordinated (e.g., in units of TSF time) on an independent channel (e.g., second WiFi radio, MU-MIMO beams, Bluetooth, flashing IR LEDs, ultrasound, etc.), so as to minimize disruption to the forward path audio.

In some embodiments, in the Tuning Channel Access Parameters method, a backoff of the transmitter and receiver devices (e.g., TxSpeaker and RxSpeaker, respectively) medium access parameters may be modified (e.g., as indicated in the 802.11 standard). In some embodiments, an increase in the backoff may deprioritize a link. In some embodiments, a decrease in the backoff may increases the priority of a link.

In some embodiments, in the NAV reservations method, the transmitter may open up a NAV window for the receiver (e.g., an RxSpeaker) to use for the reverse link. In those embodiments, the RxSpeaker may have a customized response to the Request to Send (RTS) and Clear to Send (CTS) in the 802.11 standard. Still, in those embodiments, the transmitter and receiver may share information on how the NAV window may be coordinated.

In some embodiments, in Step 312, the device may output the Link Schedules. In some embodiments, in Step 314, the device may output physical and network coding. In some embodiments, in Step 316, the device may output source coding. In some embodiments, the respective outputs will be provided to the different elements in the audio transmission and reception pipeline within device. For example, in some embodiments, the physical coding rate can be provided to the physical layer of a radio (e.g., PHY layer of a WiFi radio). In some embodiments, the network coding rate can be provided to a network coder of the device. In some embodiments, the source coding rate can be provided to a source coder of the device. In some embodiments, in a transmission pipeline of a device (e.g., a TxSpeaker or an RxSpeaker) audio to be transmitted is first provided to the source coder. In some embodiments, the output from the source coder is provided to network coder and the output therefrom is provided to the physical layer in the radio to be transmitted to the antennas of the device.

Turning now to FIG. 4, FIG. 4 is a schematic diagram illustrating an example embodiment of a device 400 (e.g., a client device, a computing device) that may be used within the present disclosure. In some embodiments, device 400 may be a source 102, a display 104, a TxSpeaker 106, a RxSpeaker 108, a RxSpeaker 110, or a combination thereof as described with respect to FIG. 1. The device 400 is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices 400 in any number of different ways to implement a single embodiment of the present disclosure. Accordingly, embodiments of the present disclosure are not limited to a single device 400, as would be appreciated by one with skill in the art, nor are they limited to a single type of implementation or configuration of the example device 400.

In some embodiments, device 400 may include a bus 402 that can be coupled to one or more of the following illustrative components, directly or indirectly: input/output (I/O) component 404, I/O port 406, one or more processors 408, one or more memories 410, one or more presentation components 412, and power supply 414. One of skill in the art will appreciate that the bus 402 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device 400 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices 400.

In some embodiments, memory 410 can include computer-storage media in the form of volatile and/or nonvolatile memory. In some embodiments, memory 410 may be removable, non-removable, or any combination thereof. For example, in some embodiments, memory 410 may be a hardware device such as hard drives, solid-state memory, optical-disc drives, and the like.

In some embodiments, device 400 can include one or more processors that read data from components such as the memory 410, the various I/O components 404, etc. In some embodiments, presentation components 412 present data indications to a user or other device. For example, in some embodiments, presentation components 412 may include a display device, speaker, a printing component, a haptic component, etc.

In some embodiments, the I/O ports 406 can enable the device 400 to be logically coupled to other devices, such as I/O components 404. In some embodiments, some of the I/O components 404 can be built into the device 400. In some embodiments, I/O component 404 may be a microphone, joystick, recording device, game pad, satellite dish, scanner, printer, wireless device, networking device, and the like. In some embodiments, I/O port 406 may utilize one or more communication technologies, such as USB, infrared, Bluetooth™, or the like.

An aspect of the present disclosure is a method of audio transmission. In some embodiments, a transmitter (e.g., TxSpeaker 106) receives source audio data from a source (e.g., source 102). In some embodiments, the transmitter may transform the source audio data into modified audio data. In some embodiments, the transmitter may transform the source audio data by parsing the source audio data and encoding the source audio data using an encoding scheme to generate a modified audio data. In some embodiments, the transmitter may transmit the modified audio data to one or more receivers (e.g., RxSpeakers 108-110) via at least one of a forward link (e.g., forward link 112) and a reverse link (e.g., reverse link 114). In some embodiments, the transmitter may receive microphone audio data from a receiver via at least one of a forward link (e.g., forward link 112) and a reverse link (e.g., reverse link 114). In some embodiments, the microphone audio data is data corresponding to audio captured using a microphone of a device (e.g., TxSpeaker 106 and RxSpeakers 108-110).

Another aspect of the present disclosure is a method of audio transmission. In some embodiments, a receiver-transmitter (e.g., RxSpeakers 108-110) may receive modified audio data via a forward link and/or a reverse link. In some embodiments, the modified audio data may be transmitted by a transmitter-receiver (e.g., TxSpeaker 106). In some embodiments, the modified audio data may correspond to source audio data received and modified by a transmitter-receiver. In some embodiments, the receiver-transmitter may capture, using a microphone, microphone audio data. In some embodiments, the receiver-transmitter may transmit the microphone audio data via a forward link and/or a reverse link. In some embodiments, the receiver-transmitter may modify (e.g., by encoding it) the microphone audio data prior to transmitting it.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
   determining a forward link network quality corresponding to a forward link and a reverse link network quality corresponding to a reverse link;
   determining a forward link presentation delay associated with the forward link and a reverse link presentation delay associated with the reverse link;
   generating at least one of a link schedule, a physical and network coding, and a source coding for at least one of the forward link and the reverse link based on the respective forward and reverse presentation delays and the respective forward and reverse network qualities; and transmitting audio data through the at least one of the forward link and the reverse link based on the at least one of the link schedule, the physical and network coding, and the source coding;

wherein the link schedule is generated using a method selected from the group comprising: a Forward Control method, an Independent Channel Control method, a Tuning Channel Access Parameters method, and a Network Allocation Vector (NAV) Reservations method.

2. The method of claim 1, wherein determining at least one of the forward link network quality and the reverse link network quality includes determining a packet error rate, and wherein a decision to generate the at least one of a link schedule, a physical and network coding, and a source coding is based on whether the respective link network quality is above a predetermined threshold associated with a target audio quality.

3. An audio device configured to perform the method of claim 1.

4. The method of claim 1, wherein the generated link schedule allows for additional time in a link channel.

5. The method of claim 1, wherein generating a source coding includes increasing a level of audio compression associated with the source coding.

6. The method of claim 1, wherein the forward link is a communications link between a transmitting speaker and a receiving speaker and wherein the forward link comprises modified audio data corresponding to audio data from a source communicatively coupled to the transmitting speaker.

7. The method of claim 1, wherein the reverse link is a communications link between a receiving speaker and a transmitting speaker and wherein the reverse link comprises microphone audio data from a microphone communicatively coupled to the receiving speaker.

8. A non-transitory computer-readable storage medium, the computer-readable storage medium including instructions that when executed by a device, cause the device to:

determine a forward link network quality corresponding to a forward link and a reverse link network quality corresponding to a reverse link;

determine a forward link presentation delay associated with the forward link and a reverse link presentation delay associated with the reverse link;

generate at least one of a link schedule, a physical and network coding, and a source coding for at least one of the forward link and the reverse link based on the respective forward and reverse presentation delays and the respective forward and reverse network qualities; and transmit audio data through the at least one of the forward link and the reverse link based on the at least one of the link schedule, the physical and network coding, and the source coding;

wherein the link schedule is generated using a method selected from the group comprising: a Forward Control method, an Independent Channel Control method, a Tuning Channel Access Parameters method, and a Network Allocation Vector (NAV) Reservations method.

9. The non-transitory computer-readable storage medium of claim 8, wherein determining at least one of the forward link network quality and the reverse link network quality includes determining a packet error rate, and wherein a decision to generate the at least one of a link schedule, a physical and network coding, and a source coding is based on whether the respective link network quality is above a predetermined threshold associated with a target audio quality.

10. An audio device comprising the non-transitory computer-readable storage medium of claim 8.

11. The non-transitory computer-readable storage medium of claim 8, wherein the generated link schedule allows for additional time in a link channel.

12. The non-transitory computer-readable storage medium of claim 8, wherein generating a source coding includes increasing a level of audio compression associated with the source coding.

13. The non-transitory computer-readable storage medium of claim 8, wherein the forward link is a communications link between a transmitting speaker and a receiving speaker and wherein the forward link comprises modified audio data corresponding to audio data from a source communicatively coupled to the transmitting speaker.

14. The non-transitory computer-readable storage medium of claim 8, wherein the reverse link is a communications link between a receiving speaker and a transmitting speaker and wherein the reverse link comprises microphone audio data from a microphone communicatively coupled to the receiving speaker.

15. A device comprising:

a processor; and a memory storing instructions that, when executed by the processor, configure the device to:

determine a forward link network quality corresponding to a forward link and a reverse link network quality corresponding to a reverse link;

determine a forward link presentation delay associated with the forward link and a reverse link presentation delay associated with the reverse link;

generate at least one of a link schedule, a physical and network coding, and a source coding for at least one of the forward link and the reverse link based on the respective forward and reverse presentation delays and the respective forward and reverse network qualities; and transmit audio data through the at least one of the forward link and the reverse link based on the at least one of the link schedule, the physical and network coding, and the source coding;

wherein the link schedule is generated using a method selected from the group comprising: a Forward Control method, an Independent Channel Control method, a Tuning Channel Access Parameters method, and a Network Allocation Vector (NAV) Reservations method.

16. The device of claim 15, wherein determine at least one of the forward link network quality and the reverse link network quality includes determining a packet error rate, and wherein a decision to generate the at least one of a link schedule, a physical and network coding, and a source coding is based on whether the respective link network quality is above a predetermined threshold associated with a target audio quality.

17. The device of claim 15, wherein the device is a wireless speaker device.

18. The device of claim 15, wherein generating a source coding includes increasing a level of audio compression associated with the source coding.

19. The device of claim 15, wherein the forward link is a communications link between the device and a receiving speaker and wherein the forward link comprises modified audio data corresponding to audio data from a source communicatively coupled to the device.

20. The device of claim 15, wherein the reverse link is a communications link between the device and a transmitting speaker and wherein the reverse link comprises microphone audio data from a microphone communicatively coupled to the device.

\* \* \* \* \*